United States Patent
Lee et al.

(10) Patent No.: US 11,277,836 B2
(45) Date of Patent: Mar. 15, 2022

(54) METHOD FOR SELECTING RESOURCE FOR V2X COMMUNICATION BY TERMINAL IN WIRELESS COMMUNICATION SYSTEM, AND TERMINAL USING SAME METHOD

(71) Applicant: LG ELECTRONICS INC., Seoul (KR)

(72) Inventors: Jongyoul Lee, Seoul (KR); Hanbyul Seo, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 16/643,186

(22) PCT Filed: Aug. 30, 2018

(86) PCT No.: PCT/KR2018/010025
§ 371 (c)(1),
(2) Date: Feb. 28, 2020

(87) PCT Pub. No.: WO2019/045464
PCT Pub. Date: Mar. 7, 2019

(65) Prior Publication Data
US 2020/0214002 A1    Jul. 2, 2020

Related U.S. Application Data

(60) Provisional application No. 62/552,352, filed on Aug. 30, 2017.

(51) Int. Cl.
*H04W 72/04* (2009.01)
*H04B 17/318* (2015.01)
(Continued)

(52) U.S. Cl.
CPC ...... *H04W 72/0446* (2013.01); *H04B 17/318* (2015.01); *H04W 4/40* (2018.02); *H04W 72/08* (2013.01)

(58) Field of Classification Search
CPC ... H04W 72/0446; H04W 4/40; H04W 72/08; H04W 76/14; H04W 74/0808; H04W 72/0486; H04W 72/02; H04B 17/318
See application file for complete search history.

(56) References Cited

U.S. PATENT DOCUMENTS 10,142,957 B2 *    11/2018   Sheng ................... H04W 64/00
2017/0188391 A1 *   6/2017   Rajagopal ......... H04W 74/0816
(Continued)

FOREIGN PATENT DOCUMENTS

WO    2016064169    4/2016
WO    2017026813    2/2017

OTHER PUBLICATIONS

Details of Sensing for V2V, Apr. 15, 2016, 3GPP TSG-RAN WG1 #84bis, R1-163032 (Year: 2016).*
(Continued)

*Primary Examiner* — Tejis Daya
(74) *Attorney, Agent, or Firm* — Lee Hong Degerman Kang Waimey

(57) ABSTRACT

The present disclosure provides a method for selecting a resource for vehicle-to-everything (V2X) communication by a terminal in a wireless communication system, and a terminal using the method. The method comprises: determining a threshold by measuring a resource during a first time period; determining a resource state in a second time period on the basis of the threshold; and selecting a resource for V2X communication during the second time period on the basis of a determination result.

18 Claims, 16 Drawing Sheets

(51) Int. Cl.
*H04W 4/40* (2018.01)
*H04W 72/08* (2009.01)

(56) References Cited

U.S. PATENT DOCUMENTS

| | | | |
|---|---|---|---|
| 2017/0237474 A1 | 8/2017 | Haran | |
| 2019/0075603 A1* | 3/2019 | Hong | H04W 4/023 |
| 2019/0387377 A1* | 12/2019 | Zhang | H04W 52/281 |

OTHER PUBLICATIONS

UE autonomous resource selection mode in MAC CR, Aug. 26, 2016, 3GPP TSG-RAN WG2 #95, R2-165690 (Year: 2016).*

Discussion on the remaining issues of transmission UE behaviour, Aug. 26, 2016, 3GPP TSG RAN WG1 Meeting #86, R1-167077 (Year: 2016).*

Discussion on V2V SPS resource scheme, Apr. 15, 2016, 3GPP TSG-RAN WG 1 Meeting #84bis, R1-162413 (Year: 2016).*

PCT International Application No. PCT/KR2018/010025, International Search Report dated Dec. 4, 2018, 4 pages.

Ericsson, "Radio resource pool sharing between mode 3 and mode 4 UEs," 3GPP TSG-RAN WG1 Meeting #89, R1-1708942, May 2017, 6 pages.

Samsung, "Discussion on support of latency smaller than 20," 3GPP TSG-RAN WG1 Meeting #89, R1-1707907, May 2017, 4 pages.

Samsung, "Discussion on definition of sensing window," 3GPP TSG-RAN WG1 Meeting #89, R1-1707866, May 2017, 4 pages.

ZTE, "Considerations of latency reduction," 3GPP TSG-RAN WG1 Meeting #89, R1-1707776, May 2017, 4 pages.

Intel Corporation, "Resource Selection Latency Reduction for LTE V2V Sidelink Communication," 3GPP TSG-RAN NG1 Meeting #89, R1-1707302, May 2017, 7 pages.

Korean Intellectual Property Office Application No. 10-2020-7005881, Notice of Allowance dated Aug. 30, 2021, 6 pages.

Schmidt et al., "Advanced Carrier Sensing to Resolve Local Channel Congestion", 2011, 10 pages.

Huawei, HiSilicon, "Coexistence mechanisms among LAA systems", R1-150044, 3GPP TSG RAN WG1 Meeting #80, Feb. 2015, 5 pages.

Samsung, "Interlaced transmissions for co-existence with DSRC", R1-164792, 3GPP TSG RAN WG1 Meeting #85, May 2016, 6 pages.

ZTE, ZTE Microelectronics, "Discussion on duplex and interference management", R1-1612156, 3GPP TSG RAN WG1 Meeting #87, Nov. 2016, 10 pages.

* cited by examiner

METHOD FOR SELECTING RESOURCE FOR V2X COMMUNICATION BY TERMINAL IN WIRELESS COMMUNICATION SYSTEM, AND TERMINAL USING SAME METHOD

CROSS-REFERENCE TO RELATED APPLICATIONS

This application is the National Stage filing under 35 U.S.C. 371 of International Application No. PCT/KR2018/010025, filed on Aug. 30, 2018, which claims the benefit of U.S. Provisional Application No. 62/552,352, filed on Aug. 30, 2017, the contents of which are all hereby incorporated by reference herein in their entirety.

BACKGROUND OF THE DISCLOSURE

Field of the Disclosure

The present disclosure relates to wireless communication, and more particularly, to a method of selecting a resource of a terminal for V2X communication in a wireless communication system and a terminal using the method.

Related Art

Vehicle-to-everything (V2X) communication means communication with a terminal installed in a vehicle and another device, for example, a terminal installed in another vehicle, a roadside device, or a terminal of a pedestrian passing through.

Existing V2X communication provides a mode (may be referred to as a mode 3) in which a base station schedules a resource to be used by a terminal and a mode (may be referred to as a mode 4) in which the terminal selects a resource by itself within preset or predetermined candidate resources.

In particular, in the mode 4, the terminal decodes scheduling allocation of another terminal through a sensing operation to estimate a resource to be used by the other terminal in the future, and in order to prevent a resource collision with the other terminal, a resource to be used among resources except for the estimated resources was selected.

Regarding V2X communication, the reason why another terminal could predict future resources to use through the sensing operation was that resources to be used by other terminals were mainly periodic and that a data amount thereof was fixed. However, in future V2X communication, there is a high possibility that an amount of data greatly increases and transmission of data is aperiodic. Therefore, when a sensing-based resource selection method using in existing V2X communication is equally applied to future V2X communication, the probability of occurrence of resource collision may greatly increase.

In consideration of this point, a resource allocation method that may be used in V2X communication and a terminal using the method are required.

SUMMARY OF THE DISCLOSURE

The present disclosure provides a method of selecting a resource of a terminal for V2X communication and a terminal using the same in a wireless communication system.

In one aspect, provided is a method of selecting a resource of a terminal for vehicle-to-everything (V2X) communication in a wireless communication system. The method includes determining a threshold by measuring a resource during a first time interval, determining a resource status in a second time interval based on the threshold and selecting a resource for the V2X communication in the second time interval based on the determination result.

The method may further include measuring a received signal strength indicator (RSSI) in each of candidate resources for the V2X communication during the first time interval.

The threshold may be determined as a value corresponding to lower X (X is a natural number) % among RSSI values measured for each of the candidate resources.

A value of the X may be determined according to a priority of each packet, delay requirement, reliability, or a service type of data to be transmitted through the V2X communication.

The resource status may be one of an idle state and a busy state.

In a time domain, the second time interval may be located after the first time interval.

A resource for the V2X communication may be selected in a random manner in the second time interval, when the resource status is idle.

The resource selected in the random manner may be periodically re-evaluated, but when a resource status of the selected resource is determined to idle in the periodic re-evaluation process, a counter value may be decreased, and when the counter value becomes 0, the V2X communication may be performed using the selected resource.

The counter value may be maintained, when a resource status of the selected resource is determined to busy in the periodic re-evaluation process.

The first time interval may be determined based on the second time interval.

The threshold may be determined dependently on traffic transmission of other terminals in the first time interval.

In another aspect, provided is a user equipment (UE). The UE includes a transceiver for transmitting and receiving wireless signals and a processor for operating in combination with the transceiver. The processor is configured to: determine a threshold by measuring resources during a first time interval, determine a resource status in a second time interval based on the threshold, and select a resource for V2X communication in the second time interval based on the determination result.

Even though data transmitted by other terminals in V2X communication is aperiodic and variable, it is possible to transmit V2X related data while efficiently preventing resource collision.

DESCRIPTION OF EXEMPLARY EMBODIMENTS

Figure 1:
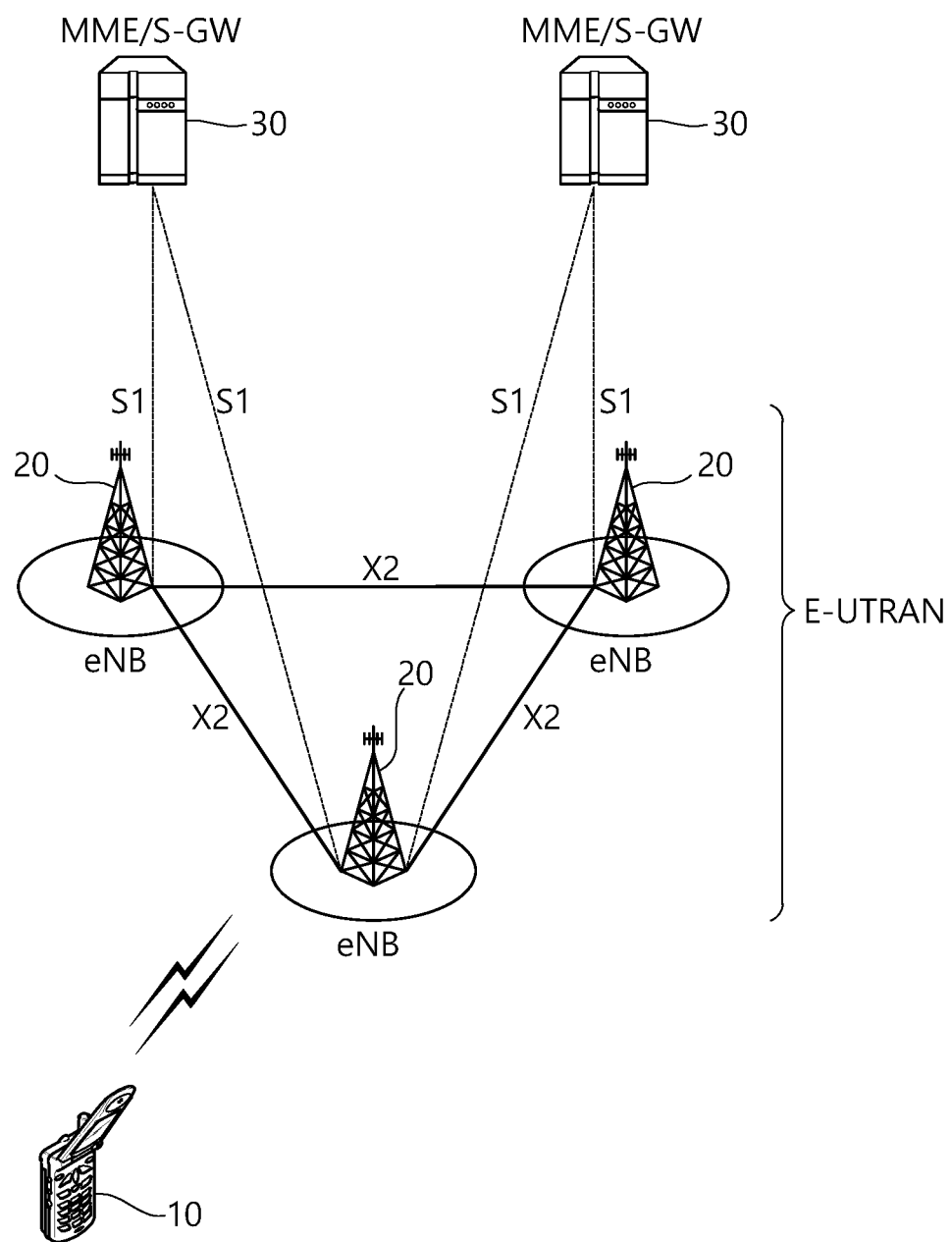
FIG. 1 shows an example of a conventional wireless communication system.

FIG. 1 illustrates an existing wireless communication system. This may be referred to as an Evolved-UMTS Terrestrial Radio Access Network (E-UTRAN) or a Long Term Evolution (LTE)/LTE-A system.

The E-UTRAN includes a base station (BS) 20 that provides a control plane and a user plane to a user equipment (UE) 10. The UE 10 may be fixed or moved and be referred to as other terms such as a mobile station (MS), a user terminal (UT), a subscriber station (SS), a mobile terminal (MT), and a wireless device. The BS 20 means a fixed station that communicates with the UE 10 and may be referred to as other terms such as an evolved-NodeB (eNB), a base transceiver system (BTS), and an access point.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network may be divided into an L1 (first layer), an L2 (second layer), an L3 (third layer) based on lower three layers of an Open System Interconnection (OSI) reference model widely known in communication systems, a physical layer belonging to the first layer provides an information transfer service using a physical channel, and a radio resource control (RRC) layer located in the third layer serves to control radio resources between the UE and the network. For this reason, the RRC layer exchanges an RRC message between the UE and the BS.

Figure 2:
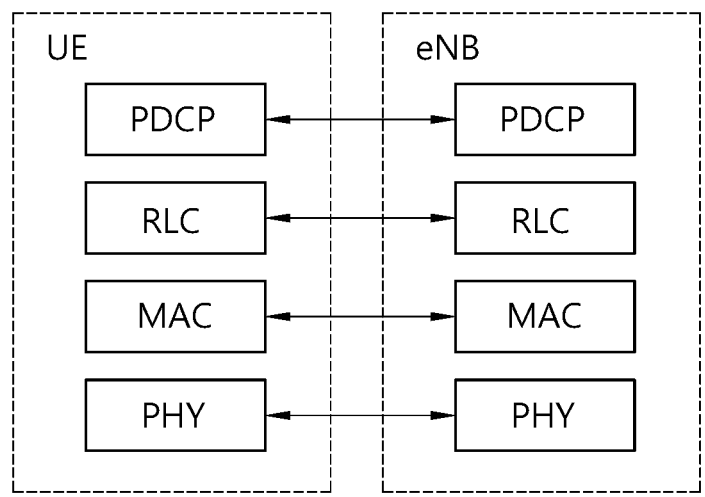
FIG. 2 is a diagram showing a wireless protocol architecture for a user plane.
Figure 3:
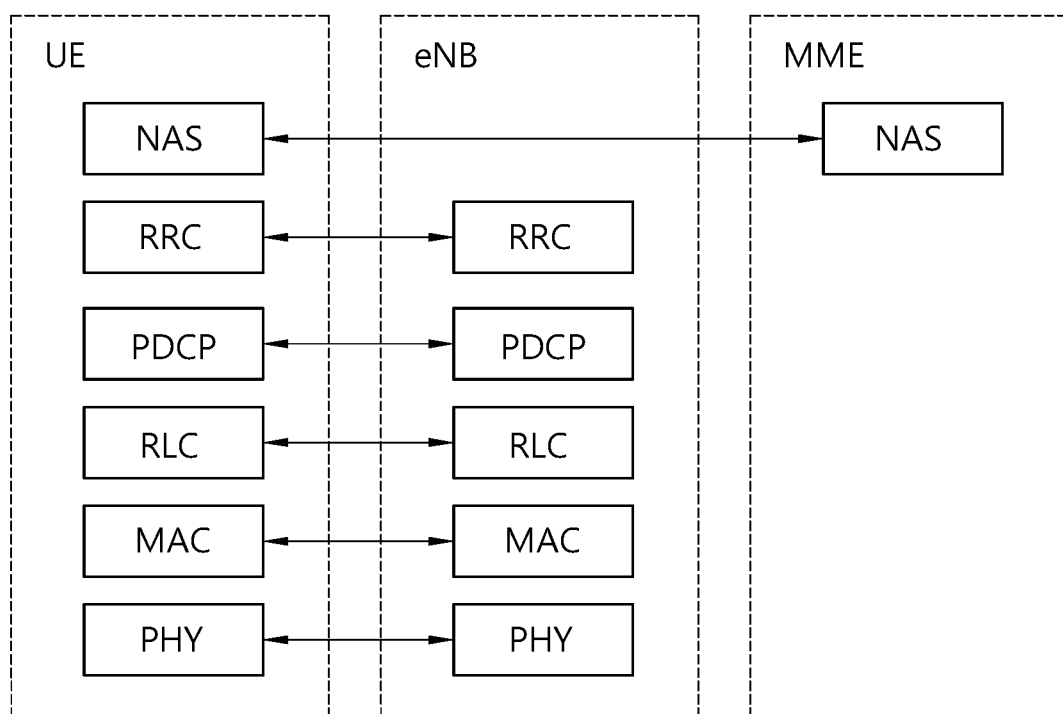
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data are moved through a physical channel between different physical layers, i.e., between physical layers of a transmitter and a receiver. The physical channel may be modulated by an orthogonal frequency division multiplexing (OFDM) scheme, and uses a time and a frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The Radio Resource Control (RRC) layer is defined only in a control plane. The RRC layer performs the control of logical channels, transport channels, and physical channels in relation to configuration, re-configuration, and release of radio bearers. The RB means a logical path provided by a first layer (PHY layer) and a second layer (MAC layer, RLC layer, PDCP layer) for data transmission between the UE and the network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

When an RRC connection is established between the RRC layer of the UE and the RRC layer of the E-UTRAN, the UE is in an RRC connected state, otherwise the UE is in an RRC idle state.

A downlink transport channel through which data is transmitted from a network to UE includes a broadcast channel (BCH) through which system information is transmitted and a downlink shared channel (SCH) through which user traffic or control messages are transmitted. Traffic or control messages of a broadcast service or a downlink multicast may be transmitted through a downlink SCH or may be transmitted through a separate downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels above the transport channel and mapped to the transport channel include a broadcast control channel (BCCH), a paging control channel (PCCH), a common control channel (CCCH), a multicast control channel (MCCH), and a multicast traffic channel (MTCH).

The physical channel is configured with several OFDM symbols in a time domain and several sub-carriers in a frequency domain. One sub-frame is configured with a plurality of OFDM symbols in the time domain. The RB is a resource allocation unit and includes a plurality of OFDM symbols and a plurality of subcarriers. Further, each subframe may use specific subcarriers of specific OFDM symbols (e.g., first OFDM symbol) of the corresponding subframe for a physical downlink control channel (PDCCH), i.e., an L1/L2 control channel. A transmission time interval (TTI) is a unit time of subframe transmission.

Hereinafter, new radio access technology (new RAT) or new radio (NR) will be described.

As more communication devices demand larger communication capacities, there is a need for improved mobile broadband communication compared to conventional radio access technology (RAT). Further, massive machine type communications (MTC), which connect multiple devices and objects to provide various services anytime and anywhere, is also one of major issues to be considered in next generation communication. Further, a communication system design in consideration of services/UEs sensitive to reliability and latency has been discussed. The introduction of next generation wireless access technology in consideration of such enhanced mobile broadband communication, massive MTC, ultra-reliable and low latency communication (URLLC), and the like is discussed and for convenience, in the present disclosure, next generation wireless access technology is referred to as new RAT or NR.

Figure 4:
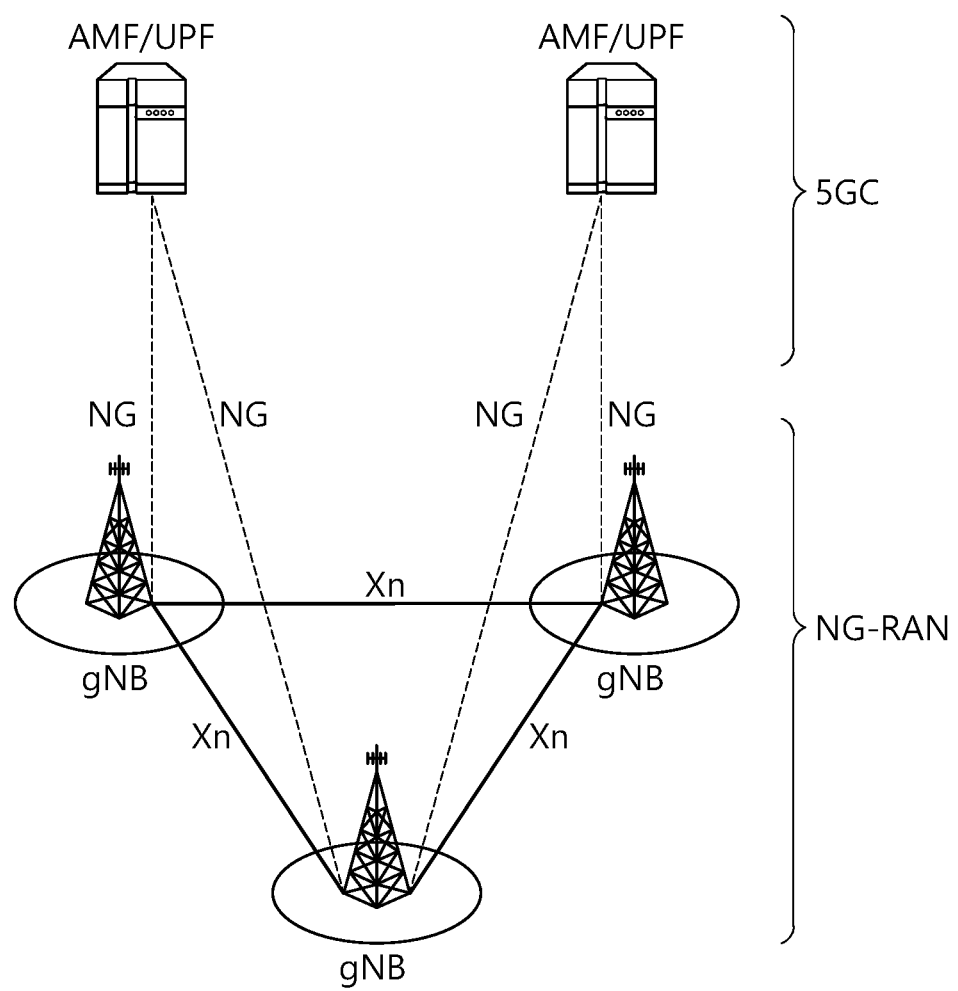
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB for providing user plane and control plane protocol termination to the UE. FIG. 4 illustrates a case of including only a gNB. The gNB and the eNB are connected to each other by an Xn interface. The gNB and the eNB are connected to a 5G core network (5GC) through an NG interface. More specifically, the gNB and the eNB are connected to an access and mobility management function (AMF) through the NG-C interface and are connected to a user plane function (UPF) through the NG-U interface.

The gNB may provide functions such as inter-cell radio resource management (inter cell RRM), radio bearer control (RB control), connection mobility control, radio admission control, measurement configuration & provision, and dynamic resource allocation. The AMF may provide functions such as NAS security and idle state mobility processing. The UPF may provide functions such as mobility anchoring and PDU processing.

Figure 5:
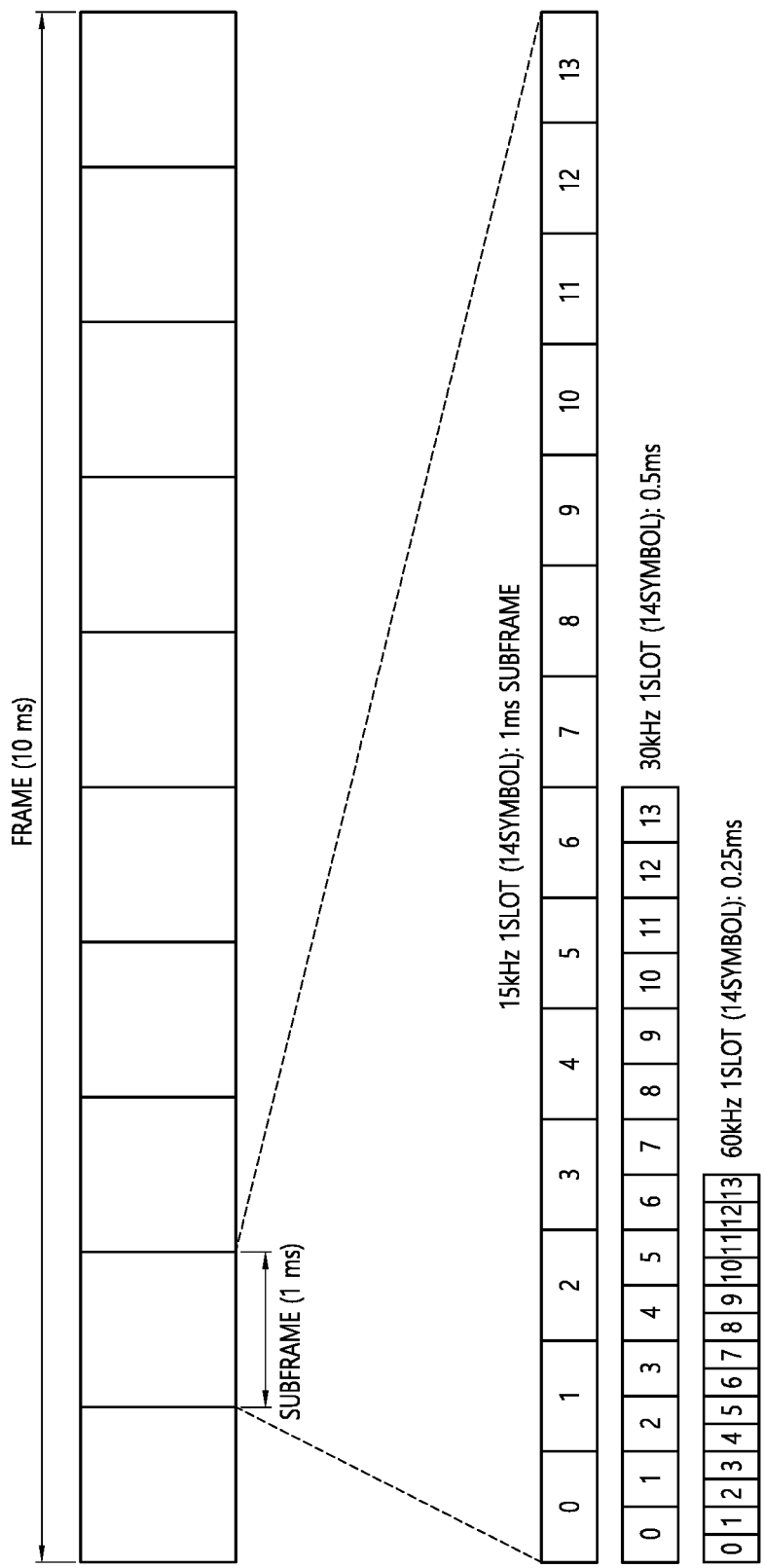
FIG. 5 illustrates a frame structure that may be applied in the NR.

FIG. 5 illustrates a frame structure that may be applied in the NR.

Referring to FIG. 5, a frame may be configured with 10 milliseconds (ms) and include 10 subframes configured with 1 ms.

One or a plurality of slots may be included in a subframe according to subcarrier spacing.

Table 1 illustrates a subcarrier spacing configuration u.

TABLE 1

| μ | Δf = $2^\mu \cdot 15$[kHz] | Cyclic prefix |
| --- | --- | --- |
| 0 | 15 | Normal |
| 1 | 30 | Normal |

TABLE 1-continued

| μ | Δf = $2^\mu \cdot 15$[kHz] | Cyclic prefix |
| --- | --- | --- |
| 2 | 60 | Normal, Extended |
| 3 | 120 | Normal |
| 4 | 240 | Normal |

Table 2 illustrates the number ($N^{frame,\mu}_{slot}$) of slots in a frame, the number ($N^{subframe,\mu}_{slot}$) of slots in a subframe, and the number ($N^{slot}_{symb}$) of symbols in a slot according to a subcarrier spacing configuration μ.

TABLE 2

| μ | $N^{slot}_{symb}$ | $N^{frame,\mu}_{slot}$ | $N^{subframe,\mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 5 illustrates μ=0, 1, and 2.

The physical downlink control channel (PDCCH) may be configured with one or more control channel elements (CCEs), as illustrated in Table 3.

TABLE 3

| Aggregation level | Number of CCEs |
| --- | --- |
| 1 | 1 |
| 2 | 2 |
| 4 | 4 |
| 8 | 8 |
| 16 | 16 |

That is, the PDCCH may be transmitted through a resource configured with 1, 2, 4, 8, or 16 CCEs. Here, the CCE is configured with six resource element groups (REGs), and one REG is configured with one resource block in the frequency domain and one orthogonal frequency division multiplexing (OFDM) symbol in the time domain.

In NR, the following technologies/features may be applied.

<Self-Contained Subframe Structure>

Figure 6:
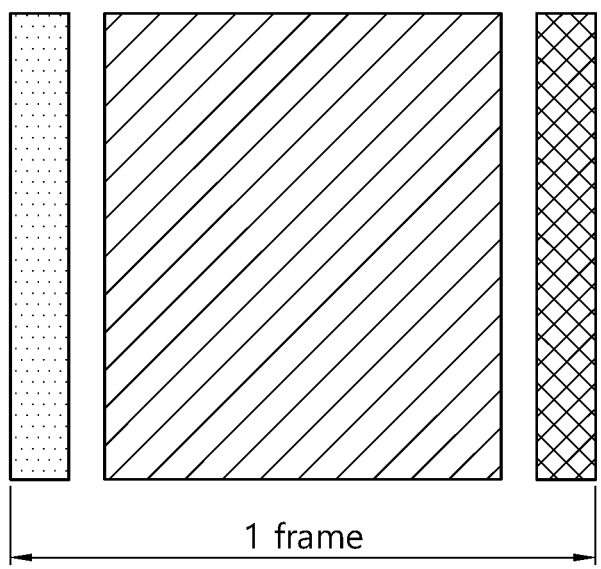
FIG. 6 illustrates an example of a frame structure that may be used in NR.

FIG. 6 illustrates an example of a frame structure that may be used in NR.

In NR, as a purpose for minimizing latency, as illustrated in FIG. 6, a structure in which a control channel and a data channel are time division multiplexed (TDM) within one TTI may be considered as one of the frame structure.

The frame may sequentially include a downlink control region, a region in which downlink data or uplink data may be transmitted, and an uplink control region. In the downlink control channel, downlink data scheduling information, uplink data scheduling information, and the like may be transmitted, and in the uplink control channel, acknowledgement/negative acknowledgment (ACK/NACK) for downlink data, channel state information (CSI), and the like may be transmitted. In one frame, some of the downlink control region/downlink data/uplink data/uplink control region may not be configured. The order thereof may also be changed.

The characteristics of such a structure is that downlink (DL) transmission and uplink (UL) transmission may be sequentially performed in one subframe and that DL data may be transmitted in a subframe and that UL ACK/NACK may be also received. As a result, when a data transmission error occurs, it takes less time to retransmit data, thereby minimizing latency of final data transmission.

In such a self-contained subframe structure, a time gap may be required for a process in which a BS and a UE switch from a transmission mode to a reception mode or a process in which a BS and a UE switch from a reception mode to a transmission mode. For this reason, at a time point of switching from DL to UL in a self-contained subframe structure, some OFDM symbols may be set to a guard period (GP).

Figure 7:
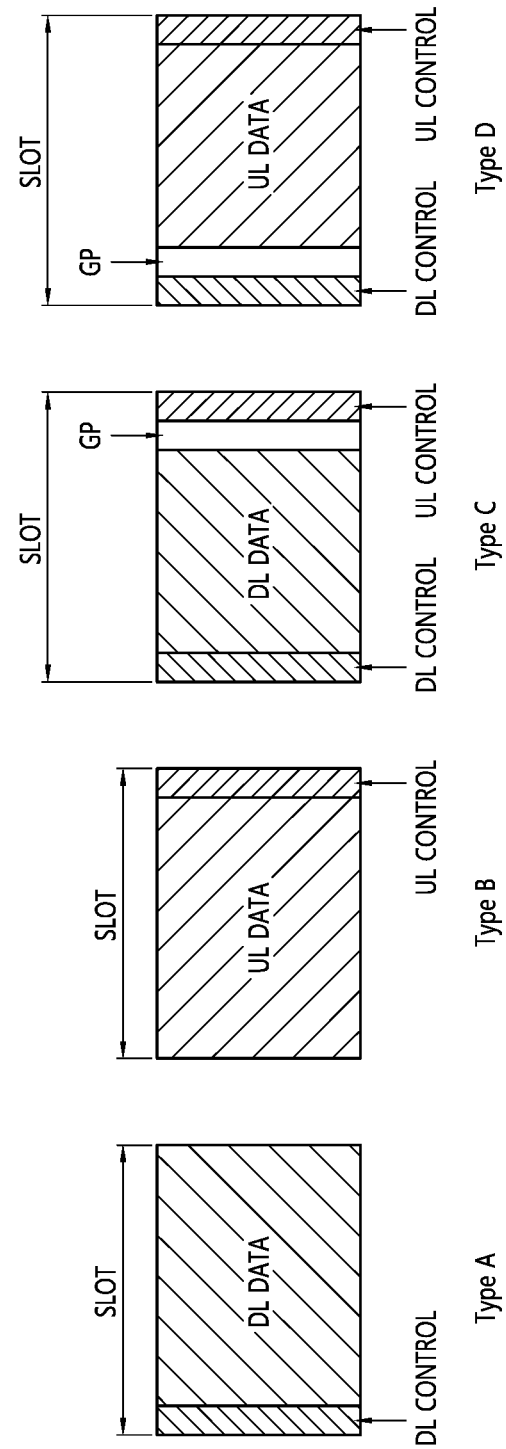
FIG. 7 illustrates examples of a frame structure in NR.

FIG. 7 illustrates examples of a frame structure in NR.

Referring to FIG. 7, a type A frame is configured with a downlink control region+a downlink data region. A type B frame is configured with an uplink data region+an uplink control region. In this case, the uplink control region may be omitted dynamically. A type C frame is configured with a downlink control region+a downlink data region+a guard period (GP)+an uplink control region. A type D frame is configured with a downlink control region+a GP+an uplink data region+an uplink control region. In this case, positions of the uplink data region and the uplink control region may be changed, and the uplink control region may be omitted dynamically.

Hereinafter, V2X communication will be described. The present disclosure relates to V2X communication, and more specifically, the present disclosure is described with focused on future enhanced V2X (eV2X) communication, but may be also applied to device-to-device (D2D) and downlink/uplink.

Figure 8:
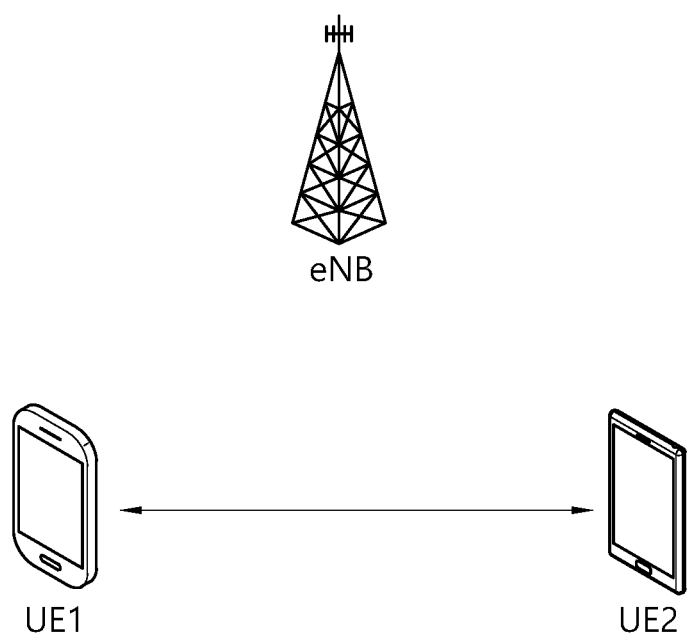
FIG. 8 illustrates terminals performing V2X or D2D communication.

FIG. 8 illustrates terminals performing V2X or D2D communication.

Referring to FIG. 8, in V2X/D2D communication, the term "UE" mainly refers to a user's terminal. However, when a network equipment such as a base station (eNB) transmits and receives a signal according to a communication method between terminals, it may also be regarded as a terminal.

An UE 1 selects a resource unit corresponding to a specific resource in a resource pool, which means a series of set of resources, and may operate to transmit a D2D signal using the corresponding resource unit. An UE 2, which is a receiving UE, may receive setting of a resource pool to which the UE 1 may transmit a signal, and detect a signal of the UE 1 within the resource pool.

Here, the resource pool may be signaled by a base station when UE1 is within the coverage of the base station. When UE1 is located outside the coverage of the base station, the resource pool may be signaled by another UE or determined as predetermined resources.

In general, a resource pool consists of a plurality of resource units, and each UE may select one or a plurality of resource units and use the selected resource unit(s) to transmit its D2D signal.

Figure 9:
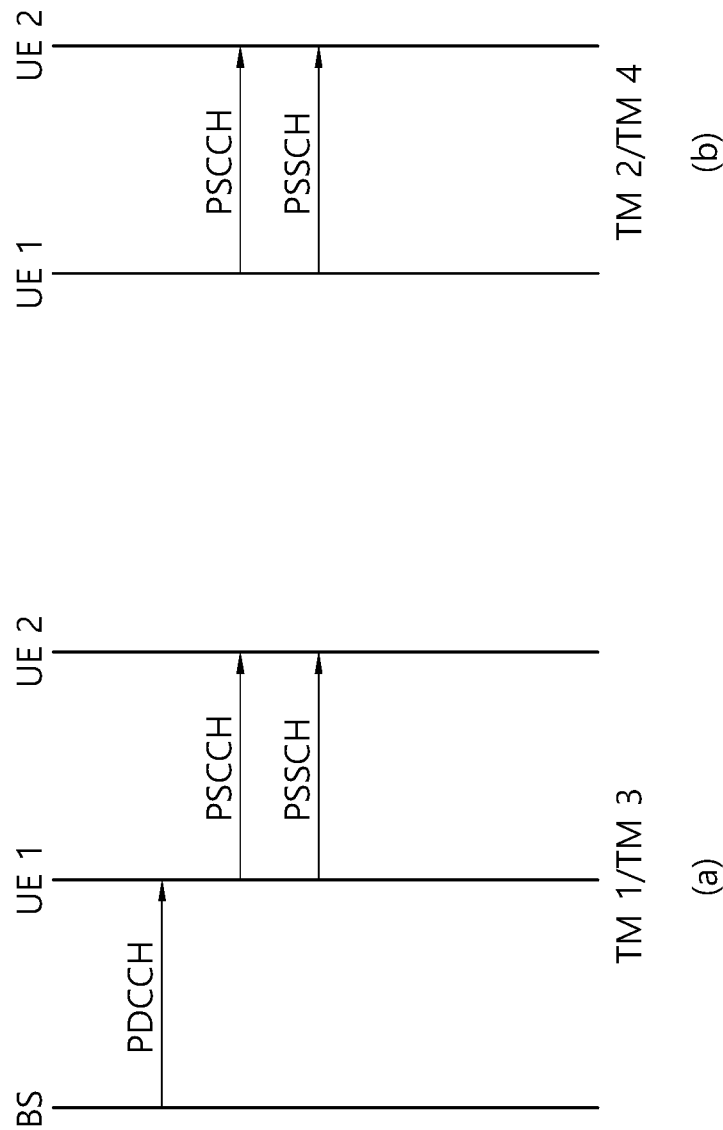
FIG. 9 illustrates how UE operates according to transmission modes (TM) related to V2X/D2D.

FIG. 9 illustrates how UE operates according to transmission modes (TM) related to V2X/D2D.

(a) of FIG. 9 is about transmission modes 1 and 3, and (b) of FIG. 9 is about transmission modes 2 and 4. In the transmission modes 1 and 3, the base station performs resource scheduling on UE 1 through PDCCH (more specifically, DCI), and UE 1 performs D2D/V2X communication with UE 2 according to the corresponding resource scheduling. UE 1 may transmit SCI (sidelink control information) to UE 2 through a PSCCH (physical sidelink control channel), and then transmit data based on the SCI through a PSSCH (physical sidelink shared channel). The transmission mode 1 may be applied to D2D, and the transmission mode 3 may be applied to V2X.

The transmission modes 2 and 4 are modes in which UE performs scheduling itself. More specifically, the transmission mode 2 is applied to D2D, and the UE may select resources itself within a configured resource pool and perform D2D operation. In the transmission mode 4, which is applied to V2X, the UE may select resources itself within a selection window through sensing/SA decoding processes and then perform V2X operation. UE 1 may transmit SCI through PSCCH and then transmit data based on the SCI through PSSCH. Hereinafter, the transmission modes will be abbreviated as modes.

While control information transmitted from a base station to a UE through the PDCCH is referred to as downlink control information (DCI), whereas control information transmitted from a UE to another UE through the PSCCH may be referred to as SCI. SCI may carry sidelink scheduling information. There may be various formats in SCI, for example, SCI format 0 and SCI format 1.

SCI format 0 may be used for scheduling of PSSCH. In SCI format 0, a frequency hopping flag (1 bit), resource block allocation and hopping resource allocation fields (the number of bits may vary depending on the number of resource blocks in the sidelink), a time resource pattern (7 bits), MCS (modulation and coding scheme, 5 bits), a time advance indication (11 bits), a group destination ID (8 bits), and the like.

SCI format 1 may be used for scheduling of PSSCH. In SCI format 1, priority (3 bits), resource reservation (4 bits), frequency resource position of initial transmission and retransmission (the number of bits may vary depending on the number of subchannels in the sidelink), time gap between initial transmission and retransmission (4 bits), MCS (5 bits), retransmission index (1 bit), reserved information bits, and the like. The reserved information bits may be abbreviated as reserved bits below. The reserved bits can be added until the bit size of SCI format 1 reaches 32 bits. That is, SCI format 1 includes a plurality of fields including different information, and the remaining number of bits except the total number of bits of the plurality of fields, out of the fixed total number of bits (32 bits) of the SCI format 1, may be referred to reserved bits.

SCI format 0 may be used for the transmission modes 1 and 2, and SCI format 1 may be used for the transmission modes 3 and 4.

Figure 10:
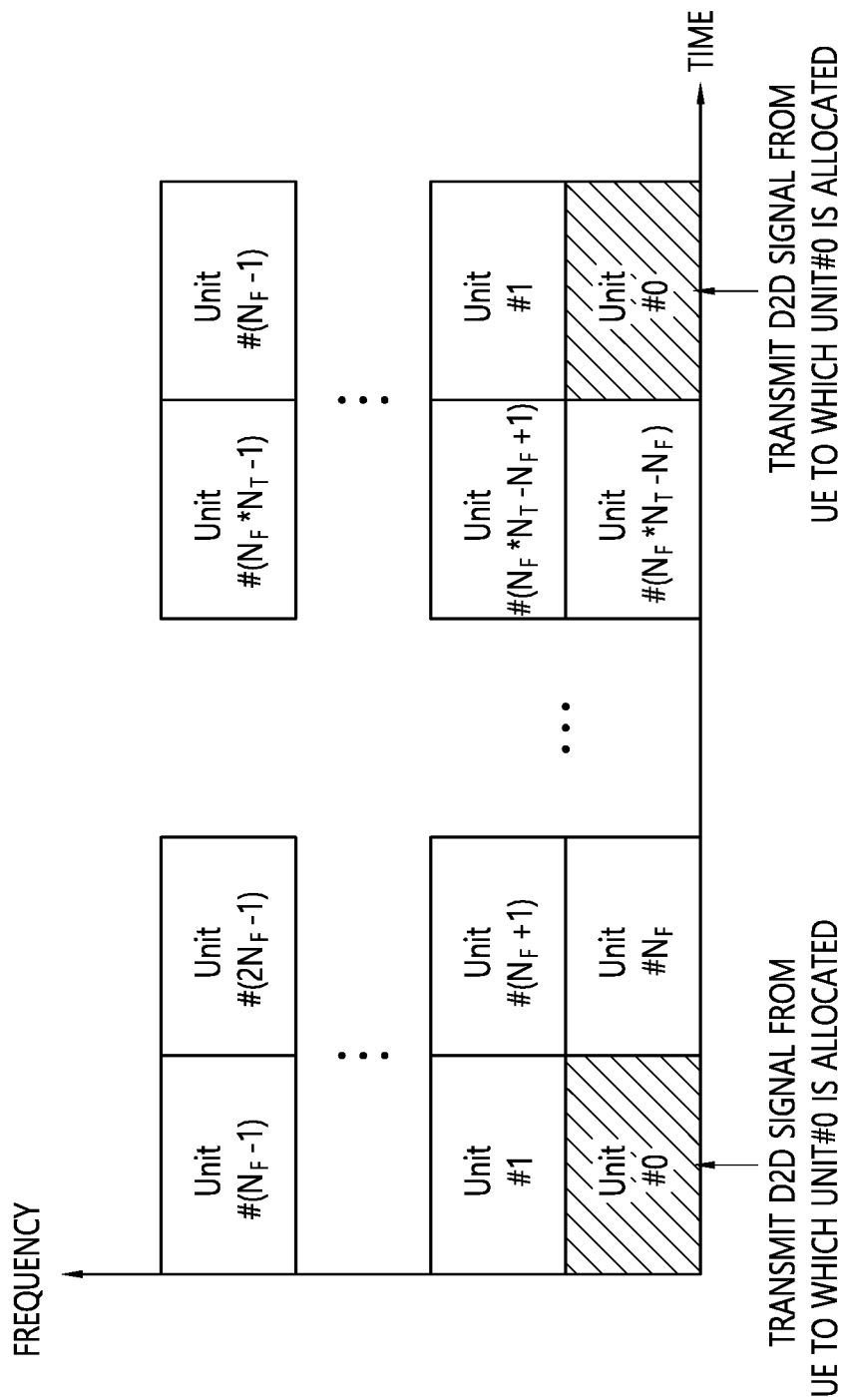
FIG. 10 shows an example of configuration of resource units.

FIG. 10 shows an example of configuration of resource units.

Referring to FIG. 10, all of the frequency resources in the resource pool may be divided into NF, and the all of the time resources in the resource pool may be divided into $N_T$, by which a total of $N_F*N_T$ resource units may be defined.

Here illustrated is a case in which the corresponding resource pool repeats for every $N_T$ subframes.

As shown in FIG. 10, one resource unit (e.g., Unit #0) may repeat periodically. Alternatively, in order to obtain a diversity effect in the time or frequency domain, the index of a physical resource unit to which one logical resource unit is mapped may change with time in a predetermined pattern. In such a resource unit structure, a resource pool may refer to a set of resource units a UE wanting to transmit a D2D signal can use for transmission.

The resource pool can be classified into various types. For example, the resource pool can be classified according to the content of a D2D signal transmitted from the resource pool. Each resource pool may be classified as follows, and the content of a D2D signal may be transmitted in each resource pool as follows.

1) Scheduling assignment (SA) resource pool or D2D (sidelink) control channel: A resource pool in which each transmitting UE transmits a signal including the position of a resource for a D2D data channel transmitted in a subsequent or same subframe and other information (e.g., modulation and coding scheme (MCS) or MIMO transmission scheme, timing advance, etc.) required for demodulation of the data channel.

The signal explained in 1) may be multiplexed and transmitted on the same resource unit, together with D2D data. In this case, a SA resource pool may refer to a resource pool in which SA is multiplexed and transmitted together with D2D data.

2) D2D data channel: A resource pool used by a transmitting UE to transmit user data using resources designated through an SA. If SA information and D2D data are multiplexed and transmitted together on the same resource unit, only a D2D data channel except SA information can be transmitted in a resource pool for the D2D data channel. In other word, resource elements (REs), which are used to transmit SA information on each individual resource unit of an SA resource pool, also can be used for transmitting D2D data in a D2D data channel resource pool.

3) Discovery channel: A resource pool for a message in which a transmitting UE transmits its ID (identity), etc. to enable a neighboring UE to find the transmitting UE.

Although the content of the above-explained D2D signal is the same, different resource pools may be used depending on the transmission/reception attributes of the D2D signal. In an example, different resource pools may be used even for the same D2D data channel or discovery message, depending on the method of determining the transmission timing of the D2D signal (e.g., whether the D2D signal is transmitted at the time of receipt of a synchronization reference signal or transmitted using a given timing advance at the time of receipt), the method of resource allocation (e.g., whether a base station designates each signal transmission resources for each individual transmitting UE or each individual transmitting UE selects each signal transmission resources on its own within a resource pool), the signal format (e.g., the number of symbols each D2D signal occupies in a subframe or the number of subframes used to transmit one D2D signal), the strength of signal from the base station, and the strength of transmitted power of a D2D UE.

As described previously, a method in which the base station itself indicates transmission resources for a D2D transmitting UE in D2D communication may be referred to as Mode 1, and a method in which a transmission resource region is preset or the base station designates a transmission resource region and the UE itself selects transmission resources may be referred to as Mode 2.

In the case of D2D discovery, if the base station itself indicates resources, this may be called Type 2, and if the UE itself selects transmission resources, this may be called Type 1.

Meanwhile, the D2D also may be called sidelink. SA also may be referred to as a physical sidelink control channel (PSCCH), and a D2D synchronization signal also may be referred to as a sidelink synchronization signal (SSS). A control channel that transmits the most basic information prior to D2D communication is referred to as a physical sidelink broadcast channel (PSBCH), and the PSBCH may be transmitted together with the SSS or may be called by a different name, a PD2DSCH (physical D2D synchronization channel). A signal for a specific UE to indicate that it is in the vicinity may include the ID of the specific UE. A channel through which such a signal is transmitted may be called a physical sidelink discovery channel (PSDCH).

In D2D, only a D2D communication UE transmits the PSBCH together with the SSS, and due to this, the measurement of the SSS is performed using the DM-RS (demodulation reference signal) of the PSBCH. An out-coverage UE may measure the DM-RS of the PSBCH and measure the RSRP (reference signal received power) of this signal to determine whether the UE itself can be a synchronization source or not.

<Analog Beamforming #1>

In millimeter wave (mmW), a wavelength is shortened to allow installation of a plurality of antenna elements in the same area. That is, in a 30 GHz band, a wavelength is 1 cm, and total 64 (8×8) antenna elements may be installed in a 2-dimension array form at 0.5 lambda (wavelength) spacing in a panel of 4 by 4 cm. Therefore, in mmW, by increasing a beamforming (BF) gain using a plurality of antenna elements, coverage can be increased or throughput can be increased.

In this case, when a transceiver unit (TXRU) is provided to enable transmission power and phase adjustment for each antenna element, independent beamforming is available for each frequency resource. However, when installing a TXRU in all 100 antenna elements, there is a problem that effectiveness is deteriorated in terms of cost. Therefore, a method of mapping a plurality of antenna elements to one TXRU and adjusting a direction of a beam with an analog phase shifter is considered. Such an analog beamforming method has a disadvantage in that only one beam direction may be made in a full band and thus frequency selective beamforming may not be performed.

Hybrid BF having the B number of TXRUs smaller than the Q number of antenna elements may be considered in an intermediate form between digital BF and analog BF. In this case, although there is a difference according to a connection scheme of the B number of TXRUs and the Q number of antenna elements, directions of beams that may be simultaneously transmitted are limited to the B number of or less.

In NR, when a plurality of antennas are used, hybrid beamforming technique that couples digital beamforming and analog beamforming may be used.

In this case, analog beamforming (or RF beamforming) means an operation of performing precoding (or combining) at an RF stage. In the hybrid beamforming, a baseband stage and an RF stage perform precoding (or combining), respectively, and thus, there is an advantage in that a performance close to digital beamforming may be exhibited while reducing the number of RF chains and the number of D/A (or A/D) converters.

Therefore, the present disclosure will be described.

The present disclosure proposes a method of effectively selecting (/reserving) and reselecting a resource when a size and/or a period of a packet to be transmitted by UEs are/is non-periodic in direct communication between UEs. Although the present disclosure has been primarily described for enhanced V2X (eV2X), the present disclosure does not exclude an application in D2D communication and downlink/uplink.

Currently, sidelink transmission has four modes. This has been described with reference to FIG. 9. Modes 3 and 4 of four modes are primarily modes for V2X communication.

Specifically, in the mode 3, a BS schedules resources, and in the mode 4, a UE autonomously schedules resources. In legacy V2X communication, traffic is defined as mainly periodic traffic, and a message generation period or delay requirement of traffic is set to minimum 100 ms. Further, in case of periodic traffic, the size-repetition number of a message for simulation was defined to periodically transmit a fixed size message of total five times of 190-bytes four times, and 300-bytes one time.

Accordingly, in the case of modes 3 and 4, the BS or the UE selects (/reserves) or reselects resources at a period of 100 ms or more according to a period of a message to be transmitted. More specifically, in the mode 4, the transmitting UE selects a transmission resource based on a sensing operation.

Figure 11:
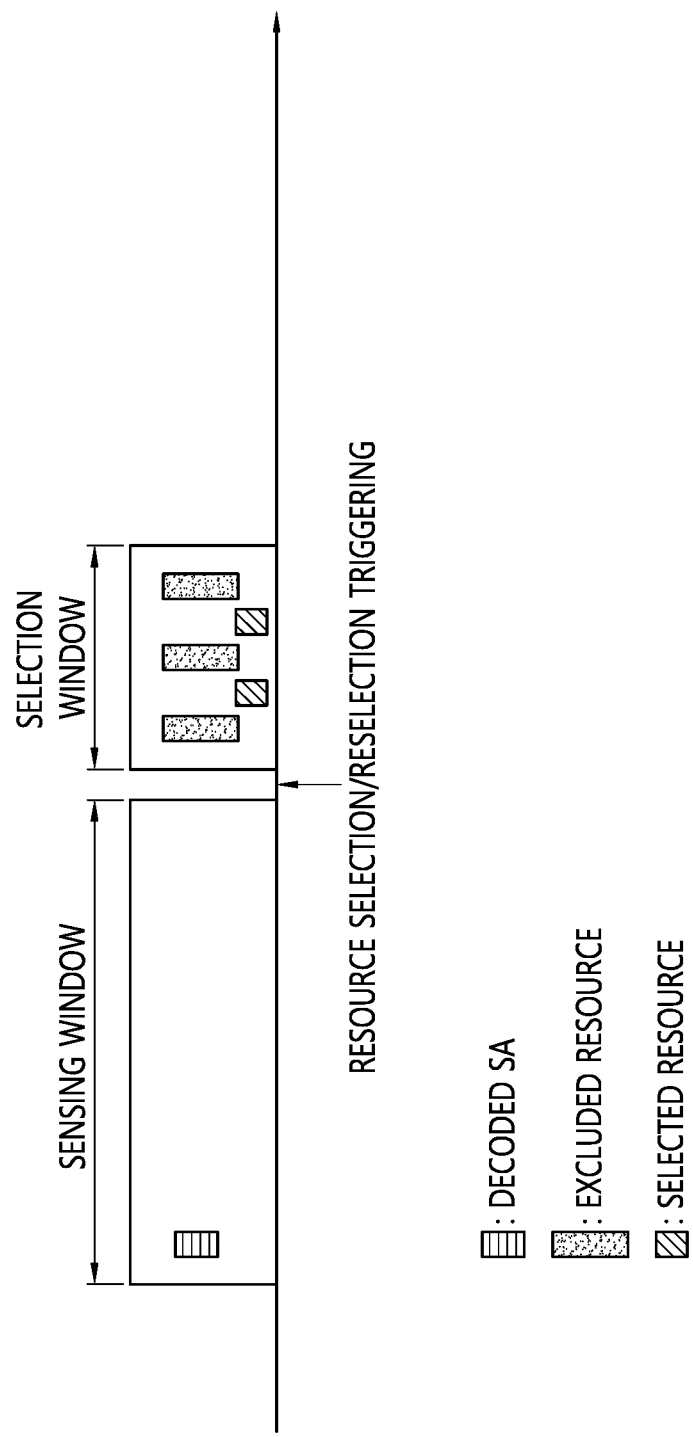
FIG. 11 illustrates a resource selection method of a UE according to the mode 4.

FIG. 11 illustrates a resource selection method of a UE according to the mode 4.

Referring to FIG. 11, the UE may perform a sensing operation in the sensing window, exclude resources in which a resource collision is expected in the selection window based on the result, and then randomly select a resource for V2X communication.

The sensing operation may perform an energy measurement operation for a channel and/or a predefined reference signal (RS) during a specific period (e.g., 1 second) before resource selection, and the UE may randomly select/(reserve) some of the candidate resources expected/selected not to be used by other UEs based on the measured value.

That is, the UE may perform a sensing operation in the sensing window and select a resource based on the sensing operation in the selection window. The sensing window and the selection window may mean a predetermined/preset time/frequency resource.

For example, the UE may exclude some resources within the selection window based on scheduling assignment (SA) decoding and/or other conditions for the other UE. When the SA and data related thereto are transmitted in the same subframe, measurement of a demodulation reference signal (DMRS) of a PSSCH may be supported.

The UE may exclude resources indicated or reserved by decoded SA and resources in which PSSCH Reference Signal Received Power (RSRP) in the associated data resource is greater than or equal to a threshold.

The SA may include a ProSe per packet priority (PPPP) field, and the PPPP field may be configured with 3 bits. The PPPP field may carry priority information of a packet.

The threshold may be set or preset as a function of priority information. A value of the threshold may be changed in a range of [−128 dBm] to [0 dBm] in 2 dB units (i.e., granularity of 2 dB) and the threshold may further include positive infinity and negative infinity.

The threshold may be determined based on priority information of a transport block and priority information of the decoded SA, and 64 values may be determined in advance.

The UE for decoding SA at TTI*m+c in a sensing period may assume that the same frequency resource by the SA is reserved at TTI*m+d+P*i. Here, P may be fixed to 100 and may be a settable value. i may be selected within a range [0, 1, . . . , 10]. Selection of i may be a problem of UE implementation. i may be signaled through a 4-bit field in the SA.

The UE may exclude X when a semi-static candidate resource X having a period P*I collides with a resource Y reserved by SA of another UE and satisfies exclusion conditions through a threshold test.

When the number of the remaining resources after the process of excluding the resources as described above is less than 20% of the total resources in the selection window, the UE increases a value of the threshold (e.g., 3 dB), and then the resource exclusion process is performed again and thus the number of remaining resources after the process of excluding the resources is greater than 20% of the total resources in the selection window.

Thereafter, the UE may perform measurement with a period P for the remaining resources.

When the counter reaches a value of 0, the UE may maintain a current resource with a probability p and reset the counter, or reselect the resource with a probability p−1. P is a carrier specific parameter, and may be set/preset among [0, 0.2, 0.4, 0.6, 0.8].

The UE may measure/rank the remaining resources (PSSCH resources) based on total received energy and select some subset thereof. The subset may be a set of candidate resources having lowest received energy. A size of the subset may be 20% of total resources in the selection window.

Thereafter, the UE may randomly select a resource in the subset.

When the UE transmits a transport block in a subframe, the UE may select the consecutive M number of subchannels.

However, the above-described sensing/resource selection operation may be effective due to the characteristics of "periodicity" and "fixed size" of traffic in existing V2X communication. That is, because the UEs periodically select (/reserve) resources, the transmitting UE could predict resources expected to be periodically selected by the other UEs through a sensing operation. That is, PSSCH-RSRP and S-RSSI values observed (/measured) by the transmitting UE through a sensing operation during the past specific section include periodicity of other UEs and the transmitting UE in which, for example, a message generation period (or delay requirement) is 100 ms based on periodicity may select the best resource based on sensing and use the selected resource until resource reselection is triggered at a period of 100 ms. Therefore, the sensing operation at a system level is to minimize a collision with resources previously periodically occupied by other UEs by reflecting the past resource occupancy state rather than a resource selection time point.

However, in services (e.g., vehicles platooning, information sharing for automated driving, remote driving, etc.) considered in enhanced V2X (eV2X) communication, traffic of as little as four times and as much as about twenty times, compared with an amount of existing traffic may be generated. Further, the traffic may be aperiodic. In such traffic having aperiodic and variable sizes, existing sensing-based resource selection may not be effective. In the case of aperiodic/variable traffic, it is difficult to predict resource allocation of other UEs and thus when a sensing-based resource selection method is applied, the probability of collision occurrence between resources of other UEs and selection resources of a transmitting UE increases.

In view of this, the present disclosure proposes the best resource allocation method for traffic in eV2X communication.

The transmitting UE (or AP) may use a carrier sense multiple access (CSMA) method belonging to a random access method among protocols for accessing to a shared wireless channel. Here, the CSMA detects a channel (or carrier) before transmission in a principle of List before Talk (LBT), which reduces the possibility of collision with other transmitting UEs.

More specifically, in the CSMA/collision avoidance (CA) method, the transmitting UE observes a channel before transmitting data, and determines whether the channel is in an idle state based on Clear Channel Assessment (CCA), and if the channel is in an idle state, the transmitting UE reduces the selected random counter and if the channel is in a busy state, the transmitting UE maintains the random counter.

When the random counter becomes 0 by repeating such a process, the transmitting UE transmits data and resets the random counter when NACK comes (or ACK does not come) from the receiving UE after transmitting data and thus performs the above process. In this case, in order to further prevent the collision, the transmitting UE may increase exponentially a selection range of the random counter. That is, the transmitting UE avoids a collision with a method of transmitting data after waiting for a time as long as the random counter by reducing the random counter in the case of idle and by increasing the random counter in the case of busy.

CCA includes carrier sense (CCA-CS) and energy detection (CCA-ED). When a receiver detects and decodes a preamble signal to detect another preamble signal, the CCA-CS is a method of reporting the received frame to an upper layer in a busy state with a length as long as a length field of a physical layer convergence protocol (PLCP) header indicates.

However, the CCA-ED determines that the channel is busy when the measured RSSI value is larger than the threshold based on a fixed threshold determined based on intensity of the current signals. The CCA-CS determines whether the channel is in a busy status during an accurate length interval, whereas the CCA-ED determines whether the channel is in a busy status by comparing with a predefined threshold at every slot time.

For example, in Wi-Fi, because interference does not come relatively consistently, the channel is occupied by determining whether the channel is in an idle/busy status based on a fixed threshold calculated using only current signal intensity (CCA-ED).

However, in the OFDM system like LTE, an influence of interference according to inter-symbol interference and co-channel interference is not only large, but also in a congestion environment, interference between the UEs and collisions of resource selection have a significant impact on performance degradation and thus another resource allocation method is needed. For this reason, for example, in sidelink transmission for V2X in which the BS does not currently involve, resource allocation through sensing is performed.

In aperiodic/variable traffic, efficient resource allocation is available in a kind of "hybrid" method by appropriately using the resource allocation method based on the past situation like the aforementioned CCA method and sensing operation. That is, interference is considered by reflecting the past channel state, and dynamic resource allocation is possible at every hour or shorter period for aperiodic traffic.

In frequent interference and irregular systems, past channel information prior to resource selection is also required. Accordingly, there is proposed a method of dynamically selecting resources at every TTI or a specific short duration based on a CCA threshold sequentially dynamically changed by reflecting past channel information.

Figure 12:
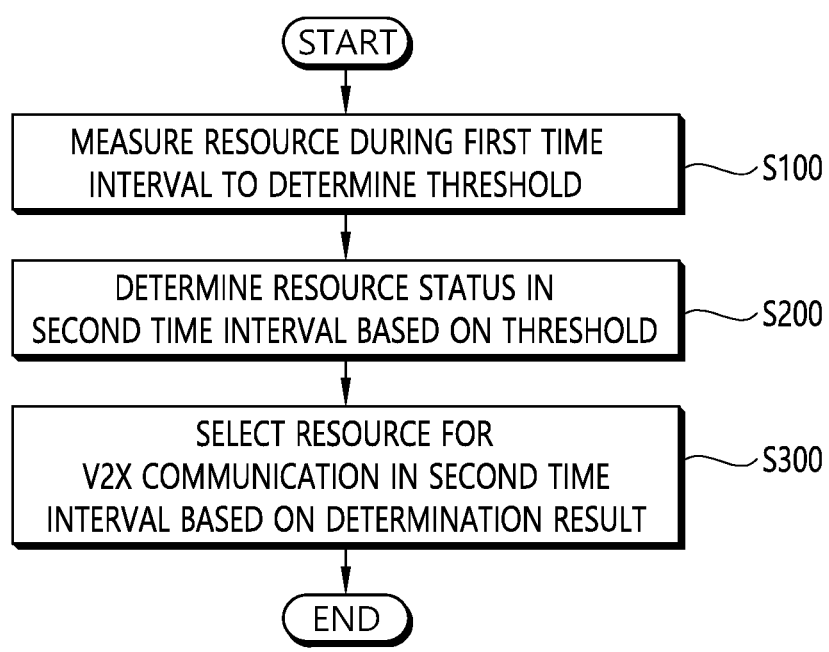
FIG. 12 illustrates a resource selection method of a UE according to an embodiment of the present disclosure.

FIG. 12 illustrates a resource selection method of a UE according to an embodiment of the present disclosure.

Referring to FIG. 12, the UE measures a resource during a first time interval to determine a threshold (may be referred to as a CCA threshold) (S100). The UE determines a resource status in a second time interval based on the threshold (S200), and selects a resource for V2X communication in the second time interval based on the determination result (S300).

Hereinafter, each step of FIG. 12 will be described in detail.

The present disclosure may be referred to as a kind of CCA-ED method, which requires a predefined CCA threshold.

In the present disclosure, the threshold may be determined dependent on priority information delivered with a predefined channel and/or a priority or latency requirement and reliability of the packet.

Alternatively, the threshold may be a function of a channel busy ratio (CBR). For example, when a traffic load in coverage is high, a narrow target range is a general V2X attribute, and in this case, a relatively high interference resource may be used, and in contrast, when a traffic load is low, in order to satisfy a long target range, relatively low interference resources should be used. The UE may determine information about the traffic load by measuring the CBR to use the information in order to determine the threshold.

Specifically, the threshold may be determined as follows.

(1) a value raised by a predefined specific dB based on an RSSI value to be a boundary that satisfies a predefined specific ratio (e.g., lower x % or higher x %) or a boundary value thereof in a set of RSSIs measured at every resource pool (or per resource unit, sub-channel, resource element, or full band) during a predefined specific period (e.g., 1 second).

That is, a received signal strength indicator (RSSI) is measured in each of candidate resources for the V2X communication during a first time interval, and a value corresponding to a lower X or upper X (X is a natural number) % among RSSI values measured for each of the candidate resources may be determined as the threshold.

Here, a resource to be a target of the RSSI set may be defined in advance or may sequentially vary.

The channel monitoring process (e.g., RSSI measurement and RSSI set determination) may be always monitored regardless of resource selection triggering, and thus calculate the CCA threshold at any time based on the past.

A ratio of x % may be defined in advance, and a corresponding value may vary according to PPPP or a service type (e.g., application ID, destination ID). For example, a packet having high PPPP may lower a value of x and thus a resource with less interference may be selected. For example, when an overall channel condition is good based on the CBR, a value of x may be increased to increase a selection width of resources.

In the case of too much interference, in order to prevent an attempt of resource selection, a threshold may have an upper limit or a lower limit.

(2) In order to satisfy a specific ratio (e.g., lower x % or higher x %) of the RSSI set defined in the above (1) according to predefined receiver sensitivity or modulation and coding rate sensitivity, the threshold may be defined as a value increased by a specific dB (e.g., a value greater by 20 dB than −82 dBm, which is the minimum sensitivity for modulation and coding rate in a primary 20 MHz channel). In this way, predefined receiver sensitivity may be dynamically adjusted by dB in which past channel conditions are reflected.

A process of obtaining a threshold in a situation where a resource pool is given as illustrated in FIG. 10 will be described in more detail.

It is assumed that the UE determines an idle/busy status of resources by measuring an RSSI of the past $N_T$ number of time units in a situation in which a resource pool having a structure illustrated in FIG. 10 is given. Therefore, the UE has the total $N_T*N_F$ number of resources in an RSSI measurement set using when determining an idle/busy status of each resource at a specific time point and measures an RSSI of each resource. RSSIs measured in each of the $N_T*N_F$ number of resources may be aligned, and then for example, a value to be a boundary of lower 20% may be determined as a threshold of IDLE/BUSY.

For example, when the UE determines whether the resource (or channel) is in an idle or busy status at a specific time t, it is assumed that it was observed that an RSSI distribution of the resources measured during the past $N_T$ time is uniform distribution at [−100 dBm, −50 dBm] section. Accordingly, a threshold on whether a state of resources used by the UE at a time point t is idle/busy is −90 dBm, which is a boundary of lower 20%.

As a time passes, when the UE again determines whether the resource (or channel) is in an idle/busy status at a time point t+x, an overall system load is increased and thus it is assumed that it was observed that an RSSI distribution of the resource measured during the past $N_T$ time is a uniform distribution in [−80 dBm, 0 dBm] section. Therefore, in this case, a threshold on whether a resource is in an idle/busy status is −64 dBm, which is a boundary of lower 20% on this distribution. Eventually, at a time point t+x, a system load is increased and thus overall interference is increased, and in such a situation, the threshold is raised and thus even if some interference occurs, an effect of attempting to use a relatively good resource occurs.

Figure 13:
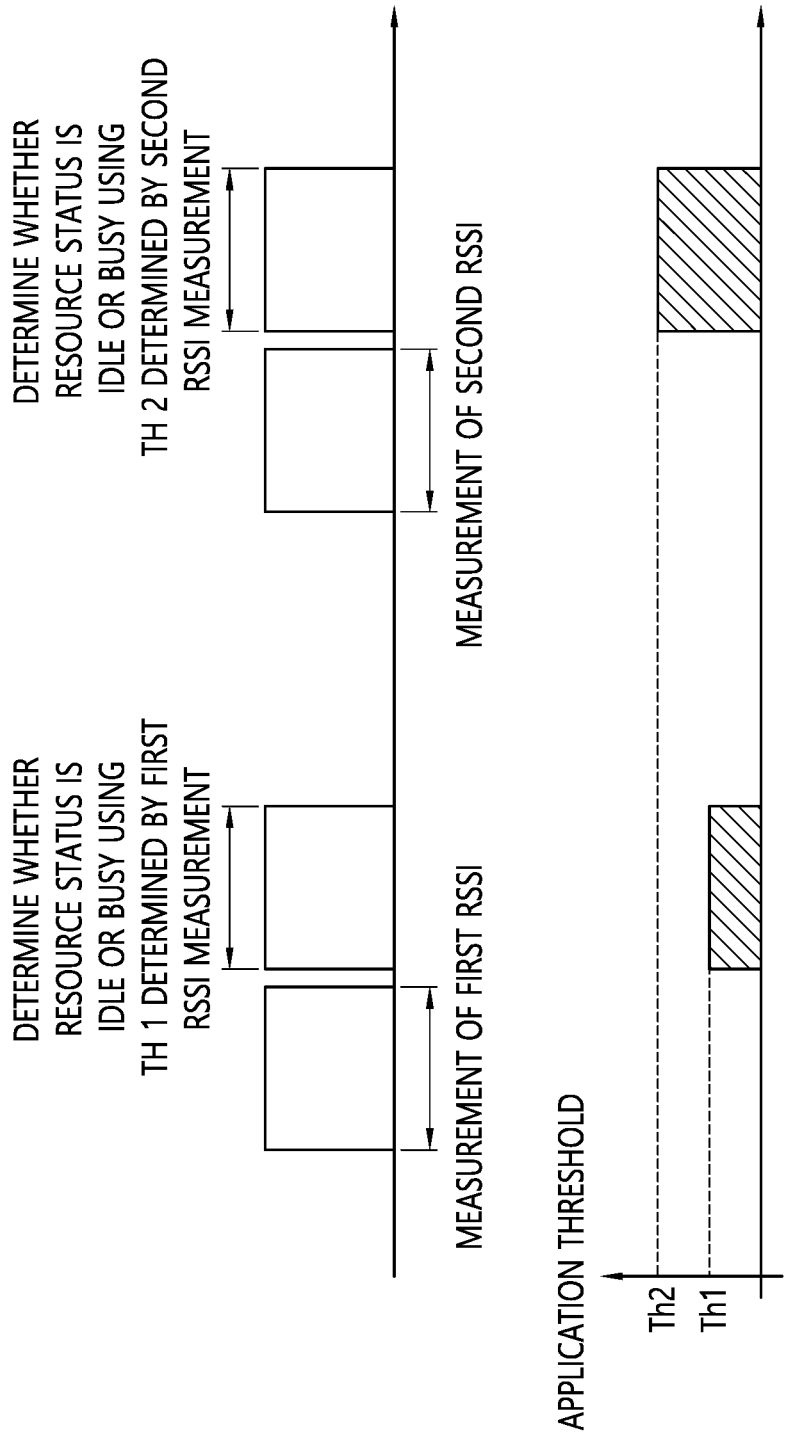
FIG. 13 illustrates a specific example of resource selection according to the present disclosure.

FIG. 13 illustrates a specific example of resource selection according to the present disclosure.

Referring to FIG. 13, the UE measures a first RSSI in a specific section. Thereafter, the UE determines whether a resource (or channel) state is idle or busy using a threshold Th 1 determined by measurement of the first RSSI. If a distribution of the first RSSI measured during the specific interval is uniform in [−100 dBm, −50 dBm] section, the threshold Th 1 may be, for example, −90 dBm, which is a boundary of lower 20% of the RSSI distribution.

After a certain time has elapsed, the UE measures a second RSSI in a specific section. Thereafter, the UE determines whether a resource (or channel) state is idle or busy using a threshold Th 2 determined by measurement of the second RSSI. For example, it is assumed that an overall system load is increased and thus a distribution of the second RSSI measurement result is uniform in [−80 dBm, 0 dBm] section. Therefore, in this case, the threshold Th 2 on whether the channel state is idle/busy may be −64 dBm, which is a boundary of lower 20% in the distribution.

Hereinafter, a description will be given on a method of selecting a resource based on the CCA-threshold defined above.

(1) The UE triggered by resource (re)selection may select randomly (or in random order) a resource (or resource unit, data pool, subchannel, RE, or full band) determined to an idle state in a current frame based on the CCA threshold defined above. The randomly selected resource may be reserved on the frequency/time axis as much as possible in the size of a packet to be transmitted, and the reserved information may be notified to other UEs through a predefined channel.

(2) The transmitting UE may select randomly (or in rank order) a resource (or resource unit, data pool, subchannel, RE, or full band) determined to an idle state in a current frame based on the CCA threshold defined above and then reevaluate the resource for a predetermined time without using the resource.

The method of re-evaluation is, for example, a method of evaluating the selected resource at every TTI or at a specific short duration on the same time axis, reducing a preselected random counter in case of idle, and using the resource, if a counter value is finally 0. When the case of busy occurs while reducing the random counter, the existing random counter may be maintained and a new random counter may be defined. In this manner, collisions between UEs that simultaneously select the same resource may be more prevented.

Here, the CCA threshold used in the random counter method may determine a CCA threshold based on observation up to that time point when resource allocation is started by generation of a packet, until the corresponding packet is transmitted (or until the counter is ended), the threshold may be maintained, or the threshold may be updated at every TTI or at a specific short duration while backing off.

A method of generating a random counter will be described. In a congestion situation, multiple UEs may attempt to preempt the same resource, and this may cause performance degradation due to a collision. Therefore, counter generation may take into account a priority, latency requirement, and reliability of the CBR or a packet to be currently sent. For example, if the CBR is high, a generation window of the counter value may be increased, and a counter generation window may be reduced for a packet having a high priority.

A process of obtaining a more optimal CCA threshold than the above method will be described.

In the above description, in order to reflect past channel conditions, idle/busy determination was made for all candidates of a current resource selection time using CCA thresholds extracted from past RSSI monitoring sets. Implementation complexity is higher than that of the proposed method, but the following method may be used in a more optimal method.

Figure 14:
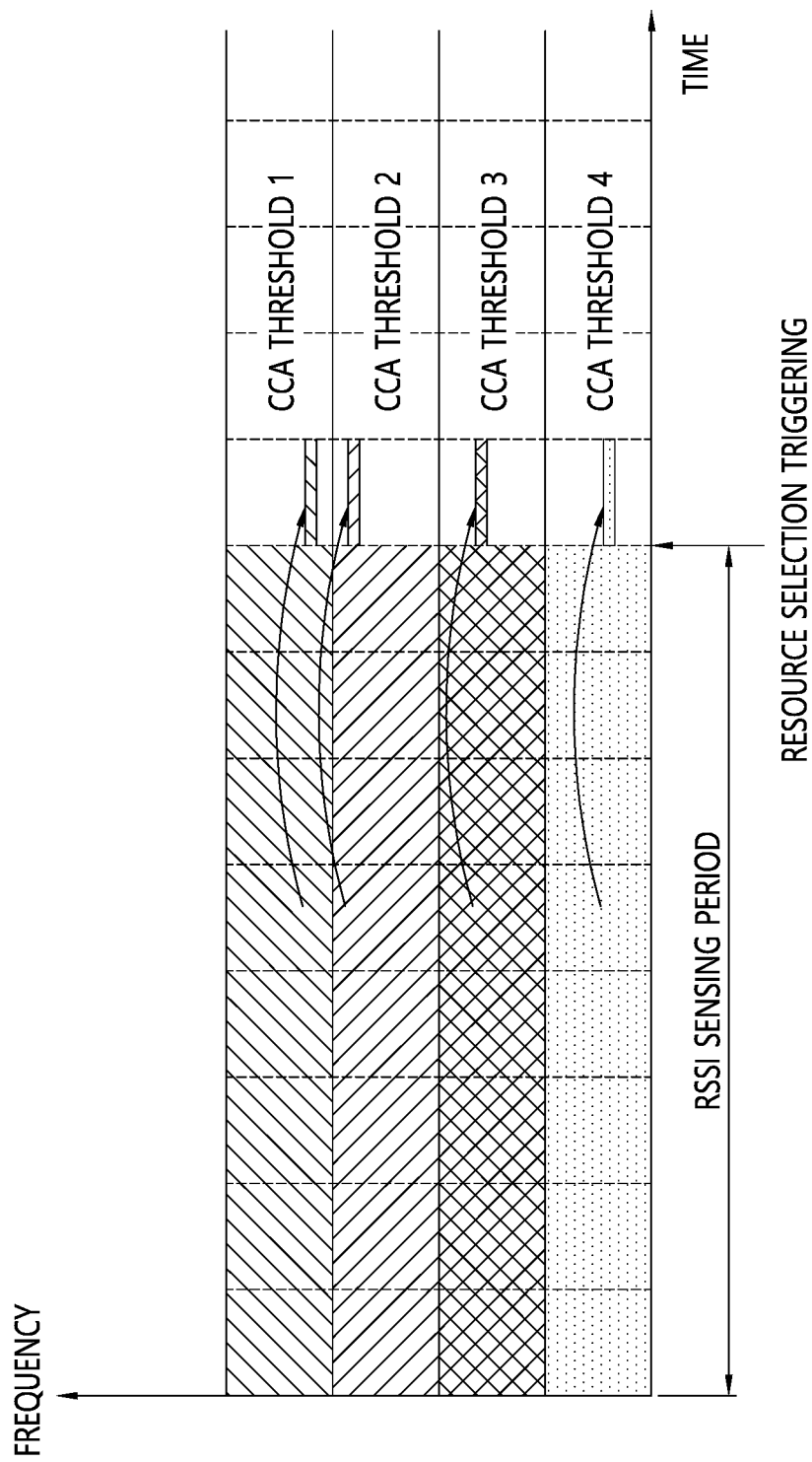
FIG. 14 illustrates another example of extracting a threshold.

FIG. 14 illustrates another example of extracting a threshold.

Referring to FIG. 14, in an RSSI sensing period, RSSI sensing may be performed for each resource set separated with a frequency axis, and different CCA thresholds may be extracted for each resource set.

That is, there is each resource set separated on the frequency axis (here, the unit of frequency may be various, such as 1 RE, 1RB, a subchannel, and a plurality of subchannels), and a value corresponding to the RSSI value of higher x % proposed above by each resource set may be extracted as a CCA threshold at each frequency (e.g., 1 RE, 1 RB, subchannel, and a plurality of subchannels). Therefore, at a resource selection triggering n time point, the UE may determine more optimally an idle/bus status of the resource (or channel) with different CCA thresholds for each frequency.

As an effect when applying different CCA thresholds to the frequency axis, performance degradation according to a frequency selective channel occurs in a V2X communication scenario with a large Doppler effect and idle/busy is determined with a CCA threshold in which frequency selection is reflected and thus evaluation is more stably available. When it is difficult to extract the CCA threshold in all sensing periods with high implementation complexity, a CCA threshold of each frequency may be generated with the RSSI value periodically extracted in the sensing period.

It may be regarded that the above-proposed resource selection method has advantages over existing resource selection methods (e.g., sensing) when a UE generating aperiodic/variable traffic is dominant or commonly distributed. Accordingly, the transmitting UE may select a resource selection method from the existing method and the proposed method according to the distribution of transmission traffic of the UEs in the coverage. For example, when a UE for transmitting a periodic message in the coverage is dominant, the existing resource selection method may be used, and in an opposite case, a proposed resource selection method may be used. Use traffic distribution information of the UE may be signaled to the UE with a predefined channel or may be signaled directly to the UE through a higher layer signal. Further, as an example, the UE may use an existing operation when the packet to be simply transmitted is periodic and use a proposed operation when the packet to be transmitted is aperiodic.

For example, in Wi-Fi, CCA is performed to occupy a full band, whereas the above-proposed method has the advantage of being able to frequency division multiplexed with the frequency axis (e.g., monitoring for each resource pool, each subchannel, and each resource element).

That is, in order to differentiate with CCA of Wi-Fi, the threshold test may be applied to other frequencies at the same time point. For such frequency division multiplexing (FDM), time synchronization of each UE should correspond and the same unit boundary should be maintained. The reason why time synchronization should correspond is that FDM through fast Fourier transform (FFT) is possible when a time boundary of each UE is the same. When FDM monitoring is supported, if a length of a time unit is too long, much monitoring (or sensing) delay may occur. When there are many delays to monitor with the frequency axis that do not sufficiently satisfy delay requirements, a length of a time interval for determining whether idle/busy should be fully short. Here, shortening of a time length between units may mean that transmission TTIs are reduced together (e.g., 0.5 symbol TTIs) or may mean that only TTIs for CCA are reduced. However, when transmitting a packet, several consecutive units may be used together.

The advantage of a method according to the present disclosure is a congested environment. When there is an "absolute" CCA threshold like existing Wi-Fi, there may be a large delay until actual transmission after resource selection triggering in a congested environment, but the proposed method determines a relatively good channel to an idle state with the "relative" CCA threshold and thus there is no continuous delay.

Another advantage is that when transmitting delay-sensitive packets, if a state of a channel is determined using a fixed threshold, for example, if the channel continuously has a value of a threshold or more due to a fully low threshold, a problem may occur that the packet is dropped, but when a dynamic threshold is applied, it is difficult that such a phenomenon occurs. Further, in Wi-Fi, CCA was performed to occupy the full band, but the proposed method has the advantage of being able to monitor and occupy a channel by being frequency division multiplexed with the frequency axis.

Figure 15:
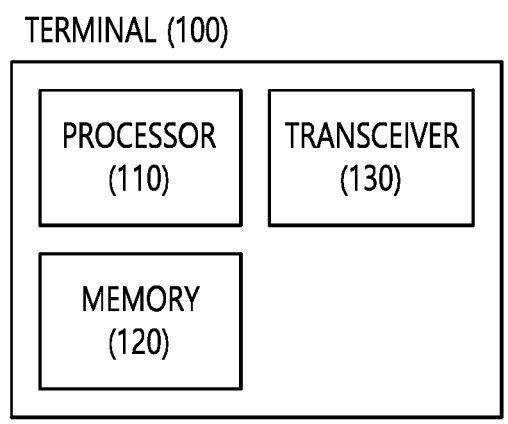
FIG. 15 is a block diagram illustrating a device in which an embodiment of the present disclosure is implemented.

FIG. 15 is a block diagram illustrating a device in which an embodiment of the present disclosure is implemented.

Referring to FIG. 15, a device 100 includes a processor 110, a memory 120, and a transceiver 130. The processor 110 implements the proposed functions, processes, and/or methods. The memory 120 is connected to the processor 110 to store various information for driving the processor 110. The transceiver 130 is connected to the processor 110 to transmit and/or receive a radio signal. The device 100 may be a BS or a UE.

Figure 16:
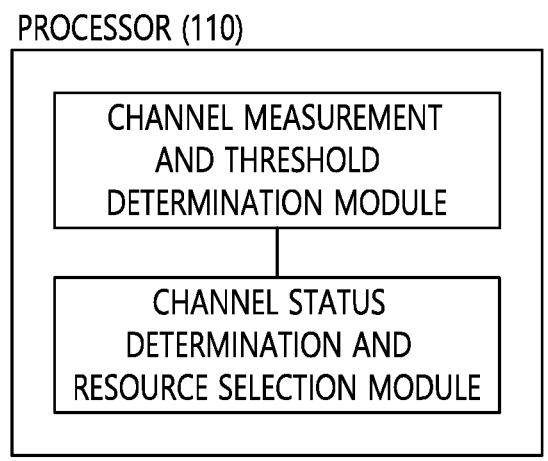
FIG. 16 illustrates an example of a processor 110.

FIG. 16 illustrates an example of a processor 110.

Referring to FIG. 16, the processor 110 may include a channel measurement and threshold determination module and a channel status determination and resource selection module. The channel measurement and threshold determination module may measure a resource during a first time interval to determine a threshold. The channel status determination and resource selection module may determine a resource status in a second time interval based on the threshold, and select a resource for the V2X communication in the second time interval based on the determination result.

The processor 110 may include an application-specific integrated circuit (ASIC), another chipset, a logic circuit, a data processing device, and/or a converter for mutually converting baseband signals and wireless signals. The memory 120 may include a read-only memory (ROM), a random access memory (RAM), a flash memory, a memory card, a storage medium, and/or another storage device. The transceiver 130 may include one or more antennas for transmitting and/or receiving wireless signals. When the embodiment is implemented in software, the above-described technique may be implemented with a module (process, function, etc.) for performing the above-described function. The module may be stored in the memory 120 and executed by the processor 110. The memory 120 may be inside or outside the processor 110 and be connected to the processor 110 by various well-known means.

What is claimed is:

1. A method of selecting a resource of a terminal for vehicle-to-everything (V2X) communication in a wireless communication system, the method comprising:
   determining a threshold by measuring a received signal strength indicator (RSSI) in each of candidate resources for the V2X communication during a first time interval;
   determining a resource status in a second time interval based on the threshold; and
   selecting a resource for the V2X communication in the second time interval based on the determination result,
   wherein the threshold is determined as a value corresponding to lower X (X is a natural number) % among RSSI values measured for each of the candidate resources.

2. The method of claim 1, wherein a value of the X is determined according to a priority of each packet, delay requirement, reliability, or a service type of data to be transmitted through the V2X communication.

3. The method of claim 1, wherein the resource status is one of an idle state and a busy state.

4. The method of claim 1, wherein in a time domain, the second time interval is located after the first time interval.

5. The method of claim 1, wherein a resource for the V2X communication is selected in a random manner in the second time interval, when the resource status is idle.

6. The method of claim 5, wherein the resource selected in the random manner is periodically re-evaluated, but when a resource status of the selected resource is determined to idle in the periodic re-evaluation process, a counter value is decreased, and when the counter value becomes 0, the V2X communication is performed using the selected resource.

7. The method of claim 6, wherein the counter value is maintained, when a resource status of the selected resource is determined to busy in the periodic re-evaluation process.

8. The method of claim 1, wherein the first time interval is determined based on the second time interval.

9. The method of claim 1, wherein the threshold is determined dependently on traffic transmission of other terminals in the first time interval.

10. A user equipment (UE), comprising:
    a transceiver for transmitting and receiving wireless signals; and a processor for operating in combination with the transceiver, wherein the processor is configured to:

determine a threshold by measuring received signal strength indicator (RSSI) in each of candidate resources for the V2X communication during a first time interval, determine a resource status in a second time interval based on the threshold, and select a resource for V2X communication in the second time interval based on the determination result wherein the threshold is determined as a value corresponding to lower X (X is a natural number) % among RSSI values measured for each of the candidate resources.

11. The UE of claim 10, wherein a value of the X is determined according to a priority of each packet, delay requirement, reliability, or a service type of data to be transmitted through the V2X communication.

12. The UE of claim 10, wherein the resource status is one of an idle state and a busy state.

13. The UE of claim 10, wherein in a time domain, the second time interval is located after the first time interval.

14. The UE of claim 10, wherein a resource for the V2X communication is selected in a random manner in the second time interval, when the resource status is idle.

15. The UE of claim 14, wherein the resource selected in the random manner is periodically re-evaluated, but when a resource status of the selected resource is determined to idle in the periodic re-evaluation process, a counter value is decreased, and when the counter value becomes 0, the V2X communication is performed using the selected resource.

16. The UE of claim 15, wherein the counter value is maintained, when a resource status of the selected resource is determined to busy in the periodic re-evaluation process.

17. The UE of claim 10, wherein the first time interval is determined based on the second time interval.

18. The UE of claim 10, wherein the threshold is determined dependently on traffic transmission of other terminals in the first time interval.

\* \* \* \* \*